(12) United States Patent
Kulakov et al.

(10) Patent No.: US 8,301,163 B2
(45) Date of Patent: Oct. 30, 2012

(54) METHOD FOR LOCATING A TERMINAL DEVICE AND A COMMUNICATION SYSTEM

(75) Inventors: Alexej Kulakov, Düsseldorf (DE); Peter Wild, Krefeld (DE); Yang Lu, Düsseldorf (DE)

(73) Assignee: Vodafone Holding GmbH, Düsseldorf (DE)

( * ) Notice: Subject to any disclaimer, the term of this patent is extended or adjusted under 35 U.S.C. 154(b) by 0 days.

(21) Appl. No.: 13/185,672

(22) Filed: Jul. 19, 2011

(65) Prior Publication Data

US 2012/0021761 A1 Jan. 26, 2012

(51) Int. Cl.
*H04W 24/00* (2009.01)
(52) U.S. Cl. .................. 455/456.1; 340/572.1; 370/338
(58) Field of Classification Search ............... 455/456.1, 455/426.1, 517, 519; 340/572.1, 686.1; 370/338, 370/329
See application file for complete search history.

(56) References Cited

U.S. PATENT DOCUMENTS

2003/0045314 A1* 3/2003 Burgan et al. ................. 455/517
2005/0239453 A1* 10/2005 Vikberg et al. ............ 455/426.1
* cited by examiner

*Primary Examiner* — Phuoc Doan
(74) *Attorney, Agent, or Firm* — International IP Law Group, PLLC

(57) ABSTRACT

There is provided a method for locating a terminal device in a network system, at least one network having several cells that are combined to form one or more tracking areas. The one or more tracking areas are combined to form an equivalent area. An exemplary method comprises transmitting a locating message from the terminal device to a network when the terminal device enters an equivalent area. Locating messages are also transmitted from the terminal device to the network at predetermined time intervals. The method also comprises indicating via the locating messages a sub-area of an equivalent area in which the terminal device is located during the transmission of a locating message. The method additionally comprises storing at least the sub-area indicated in a most recently received locating message by the network. The method further comprises transmitting at least a first terminal device tracking call by the network within the stored sub-area in order to locate the terminal device.

20 Claims, 1 Drawing Sheet

METHOD FOR LOCATING A TERMINAL DEVICE AND A COMMUNICATION SYSTEM

CROSS-REFERENCE TO RELATED APPLICATION

This application claims priority to German (DE) Patent Application No. 10 2010 031 626.1-55, filed on Jul. 21, 2010, the contents of which are incorporated by reference as if set forth in their entirety herein.

BACKGROUND

In order to establish a data connection to a terminal device in a cellular mobile network, the terminal device first has to be located, that means, it first has to be ascertained in which radio cell of the mobile telecommunications network it is located. For this purpose, before a requested data connection is established, a terminal device tracking call is sent out by the network and the terminal device then responds to this tracking call by indicating the radio cell in which it is currently located. The transmission of the terminal device tracking call is also referred to as paging.

Since a very large bandwidth of the paging channel would be necessary if the terminal device tracking call were to be transmitted throughout the entire network, adjacent radio cells are combined to form tracking areas, and, when a terminal device enters a tracking area, it transmits a locating message to the network indicating this tracking area. Moreover, locating messages are normally transmitted by a terminal device to the network at regular time intervals. Thus, the network has knowledge about the tracking area in which the terminal device is located, and the paging can be restricted to this tracking area. The smaller the tracking areas are, that is to say, the fewer radio cells they comprise, the smaller the bandwidth requirement of the paging channel, since, usually, fewer terminal devices are registered in smaller tracking areas and consequently fewer terminal device tracking calls have to be transmitted simultaneously. At the same time, however, in smaller tracking areas, a larger number of locating messages are transmitted since terminal devices often change from one tracking area to another tracking area. Thus, the size of the tracking areas results from a compromise between the bandwidth requirement of the paging channel and the frequency of locating messages.

The above-mentioned tracking areas are referred to in GSM mobile telecommunications networks (GSM: Global System for Mobile Communications) as location areas (LAs) and, within the scope of the GPRS standard (GPRS: General Packet Radio Service), as routing areas (RAs), a location area generally comprising one or more routing areas. Within the radio network referred to as UTRAN (UMTS Terrestrial Radio Access Network), according to the UMTS standard, location areas are provided as tracking areas in the circuit switched part and routing areas are provided as tracking areas in the packet switched part, as long as the terminal device is in the so-called idle state.

Currently, mobile telecommunications systems of the next generation are being developed or standardized under the designation LTE/SAE (LTE: Long Term Evolution, SAE: System Architecture Evolution), and they comprise a radio network with the designation E-UTRAN (Evolved UTRAN). Regarding E-UTRAN, the above-mentioned tracking areas according to Chapter 7.3 of the technical report TR 23.882 "3GPP System Architecture Evolution Report on Technical Options and Conclusions" of the 3GPP are referred to as tracking areas (TAs), and a tracking area can particularly be a location area or a routing area.

Also in view of a change of a terminal device from the E-UTRAN into another network such as, for example, into the UTRAN or vice versa, it has also been proposed to simultaneously associate a terminal device with a tracking area of the E-UTRAN and with a tracking area of the other network such as, for example, a location area or a routing area of the UTRAN. In this case, the transmission of a locating message from the network is only provided if the terminal device enters a tracking area of the E-UTRAN or of the other network that had previously not been associated with it, whereas when a change is made from a tracking area that is associated with the terminal device into another tracking area that is associated with it, no signal is sent to the network. In this manner, it can be avoided that a signalling has to occur in case of a change between the networks. Furthermore, it was proposed that several tracking areas of the E-UTRAN are associated with a terminal device at the same time, and likewise, a locating message is only sent to the network if the terminal device enters a tracking area that had not been associated with it previously.

The tracking areas simultaneously associated with the terminal device are referred to as equivalent tracking areas (ETAs). The concept of the equivalent tracking areas is described in Appendix D.2.4.1 of the technical report TR 23.882 of the 3GPP and in the 3GPP document R3-060457 (see http://www.3gpp.org/ftp/tsg_ran/WG3_Iu/-TSGR3_51bis/docs/R3-060457.zip).

In the concept of the equivalent tracking areas, the network does not know in which of the equivalent tracking areas the terminal device is located. According to the technical report TR 23.882, Appendix D.2.4.1, the paging then takes place correspondingly in all equivalent tracking areas. However, this involves a very high network load and leads to a very large bandwidth requirement of the paging channel.

SUMMARY

The subject innovation relates to a method for locating a terminal device in a network system. Moreover, the subject innovation relates to a communication system in which the method can be carried out.

In an exemplary method according to the subject innovation, paging can be carried out within equivalent tracking areas of a network system while entailing the smallest possible bandwidth requirement on the part of the paging channel.

A method according to the subject innovation relates to locating a terminal device in a network system. The network system comprises at least one network having several cells that are combined to form one or more tracking areas. One or more tracking areas of at least one network are combined to form an equivalent area. The terminal device transmits a locating message to a network and/or, when it enters an equivalent area, the terminal device transmits locating messages to the network at predetermined time intervals. The method provides that the locating messages indicate a sub-area of an equivalent area in which the terminal device is located during the transmissions of a locating message, and at least the sub-area indicated in the most recently received locating message is stored by the network, and that at least a first terminal device tracking call is transmitted by the network within the stored sub-area in order to locate the terminal device.

One exemplary embodiment of the subject innovation relates to a communication system. The communication system comprises at least one network having several cells that are combined to form one or more tracking areas, and one or more tracking areas of at least one network are combined to form one equivalent area, and said communication system comprises a terminal device that is configured to transmit a locating message to the network when it enters an equivalent area, and/or to transmit locating messages to the network at predetermined time intervals. In an exemplary communication system, the locating messages indicate a sub-area of an equivalent area in which the terminal device is located during transmission of a locating message. A unit is present that is configured to store at least the sub-area indicated in the most recently received locating message, and to trigger the transmission of at least a first terminal device tracking call within the stored sub-area in order to locate the terminal device.

An exemplary embodiment of the subject innovation relates to initially only carrying out the paging in a sub-area of the equivalent area that is associated with the terminal device, so that the paging area is smaller than the equivalent area. For the paging, the sub-area selected is the one in which the terminal device was located at the time of the most recent tracking area updating procedure. Since the majority of the terminal devices usually do not move far or only move slowly, there is a great probability of finding the terminal device in this sub-area. As a result, the paging is carried out more efficiently and the bandwidth requirement of the paging channel is reduced.

In one exemplary embodiment of the method and of the communication system, it is provided that the network transmits at least a second terminal device tracking call within a further sub-area of the equivalent area in which the stored sub-area is located if the terminal device does not respond to the first terminal device tracking call within a predetermined period of time.

Advantageously, the second terminal device tracking call can especially reach a terminal device that has moved out of the sub-area of the equivalent area in which it was located at the time of the most recent tracking area updating procedure, so that it could not receive the first terminal device tracking call.

In another exemplary embodiment of the method and of the communication system, the further sub-area comprises at least one sub-area being spatially adjacent to the stored sub-area and belonging to the network to which the stored sub-area belongs.

In such an exemplary embodiment, terminal devices that have only moved in a smaller radius around the location during the most recent tracking area updating procedure can be reached with the second device tracking call, without the call having to be transmitted throughout the entire equivalent area. Aside from the sub-area that is adjacent to the stored sub-area, the further sub-area preferably also contains the stored sub-area, so that the device tracking call is repeated in this area. In this manner, the second tracking call can reach a terminal device whose location has not changed since the most recent tracking area updating procedure, and which, during the first device tracking call, only temporarily had no contact with the network, for example, because of a radio interference.

Moreover, an exemplary embodiment of the method and of the communication system entails the aspect that the further sub-area comprises at least one sub-area—that spatially overlaps with the stored sub-area and/or that is adjacent to the stored sub-area and that belongs to a network that differs from the network to which the stored sub-area belongs.

In an exemplary embodiment, those terminal devices that have not changed their location since the most recent tracking area updating procedure but that have connected to another network can be reached with the second device tracking call. This exemplary embodiment also avoids having to transmit the device tracking call within the entire equivalent area. The device tracking call may be repeated within the stored sub-area, that is to say, the further sub-area also contains the stored sub-area, in addition to the sub-area of the equivalent area that is adjacent to the stored sub-area.

In one exemplary embodiment of the method and of the communication system, the stored sub-area is a first cell of a first network.

This embodiment has the advantage that the first device tracking call only has to be transmitted within a very small sub-area of the equivalent area, as a result of which the paging channel in the other cells is not affected. Particularly within an equivalent area in which most of the terminal devices are stationary over a prolonged period of time and thus do not leave a radio cell, the paging load can be considerably reduced in this manner.

In another exemplary embodiment of the method and of the communication system, it is provided that the stored sub-area is a first tracking area of the first network.

Advantageously, a tracking area is also a relatively small area in which the paging is carried out, and it is also possible to reach the terminal devices whose location has only changed slightly since the most recent tracking area updating procedure, especially those that have merely changed the radio cell within the same tracking area.

At the time of the second device tracking call, the paging area is expanded in order to reach a terminal device whose location has changed since the most recent tracking area updating procedure or which has changed to a different network. Here, the further sub-area comprises at least one cell of the first network that is spatially adjacent to the stored sub-area, and/or that the further sub-area encompasses a cell area comprising at least one cell of the second network, and the cell area spatially overlaps with the stored sub-area or is spatially adjacent to the stored sub-area.

Moreover, the further sub-area may comprise at least one tracking area of the first network that is spatially adjacent to the stored sub-area, and/or the further sub-area may comprise a tracking area section of the second network comprising at least one tracking area, the tracking area section spatially overlapping with the stored sub-area or being spatially adjacent to the stored sub-area. Here, a tracking area section comprises several tracking areas that are preferably adjacent to each other.

By extending the terminal device tracking call to a complete tracking area, the probability can be increased that the sought terminal device will be reached by the second device tracking call.

In exemplary embodiments as well, the further sub-area may also comprise the stored sub-area. In this manner, the device tracking call is repeated in the stored sub-area.

The further sub-area may also comprise the stored sub-area.

Furthermore, an exemplary embodiment of the method and of the communication system entails the aspect that the further sub-area comprises the entire equivalent tracking area to which the first sub-area belongs.

After the terminal device transmits a locating message to the network within the scope of a tracking area updating procedure once it has left one equivalent area and has entered a new equivalent area, this embodiment ensures that the terminal device can be reached by a device tracking call. This can be the second device tracking call or an additional device tracking call.

Some exemplary embodiments provide a successive expansion of the paging area with repeated device tracking calls. Another exemplary embodiment of the method and of the communication system provides that the sub-areas which were indicated in several consecutively transmitted locating messages are stored by the network, and provides that the equivalent area is reduced in size to the sub-area indicated in the most recently received locating message whenever the sub-area indicated in the most recently received locating message corresponds to the sub-areas that are contained in a predetermined number of locating messages that preceded the most recently received locating message.

In an exemplary embodiment, on the basis of the consecutive locating messages, it is first ascertained whether a terminal device is moving. If it is ascertained that this is not the case, then the equivalent area that is associated with that terminal device is restricted to the sub-area in which the terminal device is located. This ensures that stationary terminal devices are already reached with the first device tracking call, as long as they are in contact with the network.

An exemplary embodiment of the method and of the communication system provides that the sub-areas are tracking areas.

In another exemplary embodiment of the method and of the communication system, the terminal device transmits a locating message to the network system when it enters a cell of a network that does not belong to the reduced sub-area.

Moreover, an exemplary embodiment of the method and of the communication system is characterized in that the network system comprises an E-UTRAN.

BRIEF DESCRIPTION OF THE DRAWINGS

The above-mentioned and other advantages, special features and practical refinements of the invention are also explained on the basis of the description below of exemplary embodiments and provided with reference to the figures.

DETAILED DESCRIPTION OF SPECIFIC EMBODIMENTS

Figure 1:
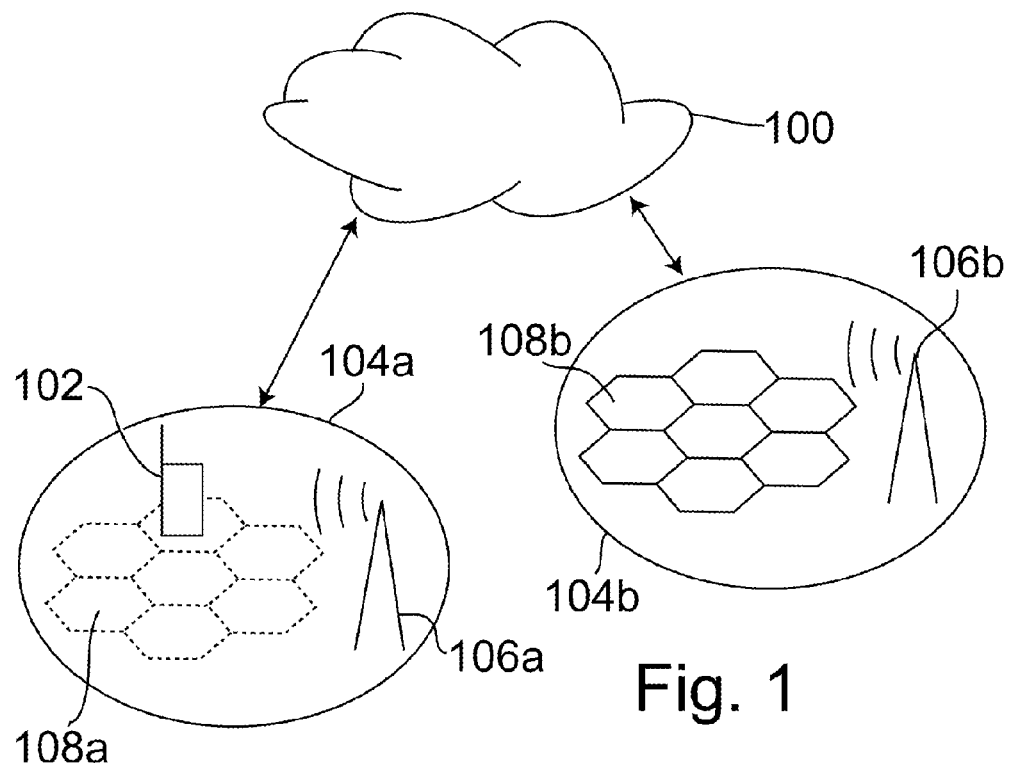
FIG. 1 is a diagram showing a schematic representation of a communication system.

FIG. 1 shows a schematic representation of a communication system with a core network 100 that contains an infrastructure for establishing data connections to mobile terminal devices 102, one of which is shown by way of an example in FIG. 1.

The core network 100 is connected with a plurality of base stations that each comprise a radio interface for access to the communication system in an associated geographic region or cell. In one embodiment, the communication system provides different access technologies for the access, and each access technology is associated with a dedicated access network having a plurality of base stations that are configured in accordance with the access technology. In the representation given by way of an example in FIG. 1, two access networks 104a,b are provided, and for each access network 104a,b, one base station 106a,b, which supplies several cells 108a,b, is shown by way of an example. In areas where several access technologies are available, the cells 108a,b that belong to different access networks 104a,b, overlap. In the representation given by way of an example in FIG. 1, the terminal device 102 is located in the access network 104a, whose cells are drawn with broken lines, whereas the cells 108a,b of the access network 104b are drawn with solid lines.

The various access technologies can differ, for example, in terms of the employed frequencies, in terms of the employed multiplexing methods, and they can use different protocols. In the present embodiment with two access networks, one access network 104a,b is a UTRAN according to the UMTS standard, while the other access network 104a,b is an E-UTRAN of an LTE/SAE system.

Terminal devices 102 of users of the communication system can connect to at least one access network 104a,b. This is preferably done via an air interface that is configured in accordance with the provided access network 104a,b. In one embodiment, a terminal device 102 is configured for a connection to several access networks 104a,b and can select the access network 104a,b. This is done on the basis of a user specification or automatically on the basis of predefined criteria. In particular, the terminal device 102 can connect, for example, to the access network 104a,b that has the highest signal strength, or a priority list is given and the highest prioritized access network 104a,b that has an adequate signal strength is selected. The priorities can be prescribed according to the capabilities of the access network 104a,b, especially according to the speed of the data transmission and/or the services that are provided via the access networks 104a,b.

In order to contact the terminal device 102, for example, for purposes of establishing an incoming data connection to the terminal device 102, the core network 100 ascertains the radio cell 108a,b in which the terminal device 102 is currently located. For this purpose, the network generates a device tracking call and transmits it within a given area. The terminal device 102 responds to the device tracking call by indicating the radio cell 108a,b in which it is located. After the response to the terminal device tracking call has been received from the terminal device 102, a communication connection to the terminal device 102 can be established.

Figure 2:
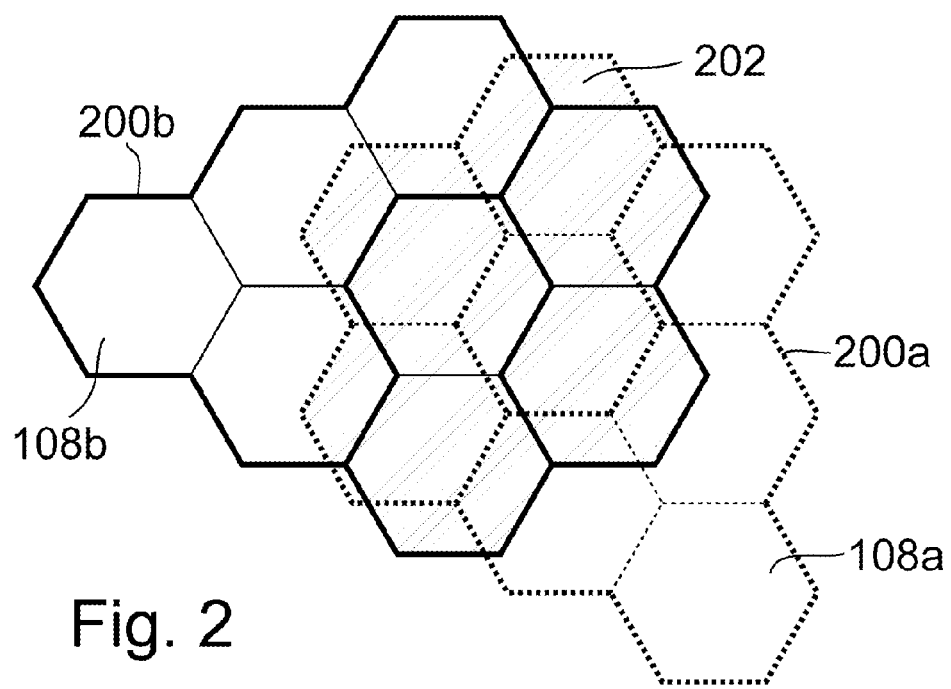
FIG. 2 is a diagram showing a schematic representation of a cellular structure of the telecommunications networks of the communication system illustrated in FIG. 1.

The device tracking call is transmitted in the radio cells 108a,b belonging to an equivalent area 202 that is associated with the terminal device 102. By way of an example, FIG. 2 shows an equivalent area 202, and the adjacent radio cells 108a,b belong to additional equivalent areas that are not depicted in FIG. 2. As shown in FIG. 2, an equivalent area 202 can comprise several tracking areas 200a,b. Tracking areas 200a,b that are combined to form one equivalent area 202 are also referred to as equivalent tracking areas. The tracking areas 200a,b—whose boundaries are shown in FIG. 2 with heavier lines than the boundary of the radio cells 108a,b—each comprise one or more radio cells 108a,b of an access network 104a,b, and said radio cells 108a,b can be defined individually. Criteria for this are, for example, the anticipated number of terminal devices 102 that are present in the radio cells 108a,b on a regular basis and/or at peak times. In one embodiment, an equivalent area 202 comprises at least one tracking area 200a in a first access network 104a and at least one tracking area 200b in another access network 104b (in the embodiment shown by way of an example in FIG. 2, each equivalent area 202 comprises two tracking areas 200a,b of an access network 104b, and the comprised tracking areas 200a,b, in turn, each comprise two radio cells 108a,b; the radio cells 108a,b that belong to the equivalent area 202 are shown by cross-hatching). The tracking areas 200a,b of different access networks 104a,b combined to form one equivalent area 202—as shown in FIG. 2—can spatially overlap at least partially, so that an equivalent area 202 covers a certain spatial area in several access networks 104a,b. However, it can likewise be provided that an equivalent area 202 contains several tracking areas 200a,b of a single access network 104a, b. Moreover, an equivalent area 202 can also consist merely of one tracking area 200a,b of a single access network 104a,b.

In the radio cells 108a,b of a tracking area 200a,b, an identifier of the radio cell 108a,b as well as an identifier of the tracking area 200a,b that is associated with the radio cell 108a,b are transmitted via a broadcast channel and can be received by the terminal devices 102 in the radio cells 108a,b. In order to ascertain in which equivalent area 202 the terminal devices 102 are located, in one embodiment, an identifier of the equivalent area 202, which is associated with a radio cell 108a,b or a tracking area 200a,b, is transmitted via the broadcast channel and received by the terminal devices 102 that are present. In another embodiment, the current equivalent area 202 is not provided via a broadcast channel by the network 104a,b, but rather a list of the contained tracking areas 200a,b is stored in the terminal devices 200 for the envisaged equivalent areas 202. On the basis of the received identifier of the tracking area 200a,b, the terminal device 102 uses the list to ascertain the equivalent area 202 in which said terminal device 102 is located. The use of a list that is stored in the terminal device 102 has the advantage that the tracking area identifier does not have to be transmitted via the broadcast channel, as a result of which the network traffic is reduced. In the terminal device 102, the list can be stored especially in the subscriber identification module that is issued by the network provider and that is required for the utilization of the communication system. Moreover, updates of the list can be transmitted by the core network to the terminal device, and these can be stored in the terminal device 102. This makes it possible to adapt existing tracking areas 200a,b and to augment new tracking areas 200a,b.

If, on the basis of a received identifier of the equivalent area 202 or on the basis of the received identifier of the tracking area 200a,b, a terminal device using the appropriate list ascertains—for example, due to a location change or due to a change in the operating state—that it has entered a new equivalent area 202, then it reports this to the network. This procedure will be referred to below as a tracking area updating procedure.

In addition to the tracking area updating procedures that are undertaken because of a change in the equivalent area 202, one embodiment also provides for periodical tracking area updating procedures to be carried out after a predetermined period of time has elapsed since the most recent tracking area updating procedures, independently of the change of the equivalent area 202. In order to carry out the periodical tracking area updating procedures, a timer is started in the terminal device 102 after each tracking area updating procedure (also after a tracking area updating procedure due to a change in location or a change in the operating state). As soon as it is ascertained on the basis of the timer that a predetermined period of time has elapsed, a tracking area updating procedure is carried out and the timer is restarted.

The information that is reported by a terminal device 102 to the communication system during a tracking area updating procedure comprises the current tracking area 200a,b and/or the current radio cell 108a,b of the terminal device 102. The tracking area 200a,b and/or the radio cell 108a,b are identified on the basis of the identifiers that the terminal device 102 has received via the broadcast channel. If only the current radio cell 108a,b is indicated during a tracking area updating procedure, then the network can ascertain the current tracking area 200a,b of the terminal device 102 on the basis of an association list between the radio cells 108a,b that are present and the tracking areas 200a,b. The information received by the network about the current tracking area 200a,b and/or the current radio cell 108a,b of the terminal device 102 is stored in the core network 100 in a register within a register entry associated with that particular terminal device 102.

The device tracking call is transmitted by the communication system when a communication connection to the terminal device 102 is to be established. In order to carry out the device tracking call, first of all, the radio cells 108a,b in which the tracking call is supposed to be transmitted are ascertained within the core network 100. Then, the core network 100 addresses the base stations 106a,b that supply the ascertained radio cells 108a,b. The base stations 106a,b then transmit the device tracking call within the ascertained radio cells 108a,b of the access networks 104a,b. For this purpose, the access networks 104a,b have a paging channel that is also referred to as a PCH in the case of 3GPP networks.

In order to ascertain the radio cells 108a,b in which the device tracking call is supposed to be transmitted, in one embodiment, the core network 100 ascertains the tracking area in which the most recent tracking area updating procedure was reported by the terminal device 102 to the communication system. Moreover, the equivalent area 202 is ascertained that is associated with the tracking area 200a,b. In this embodiment, a first device tracking call is transmitted within the tracking area 200a,b in which the terminal device 102 was located at the time of the most recent tracking area updating procedure. After the device tracking call has been transmitted to the radio cells 108a,b of this tracking area 200a,b, the core network 100 checks whether a response was received from the terminal device 102 within a predetermined period of time. If a response to the first device tracking call is received from the terminal device 102, then the communication connection to the terminal device 102 is established.

If no response to the first device tracking call is received from the terminal device 102 within the predetermined period of time, then the core network 100 initiates a second device tracking call. In order to increase the probability of reaching the terminal device 102 with the second device tracking call, the latter is transmitted within a larger area than the first device tracking call was. The second device tracking call is transmitted in the radio cells 108a,b of the tracking area 200a,b in which the terminal device was located at the time of the most recent tracking area updating procedure, and in the radio cells 108a,b of one or more additional tracking areas 200a,b of the equivalent area 202 in which the terminal device was located at the time of the most recent tracking area updating procedure. Preferably, the tracking call is extended to one or more tracking areas 200a,b that are spatially adjacent to the tracking area 200a,b in which the terminal device was located at the time of the most recent tracking area updating procedure, or—in the case of tracking areas 200a,b in several radio networks 104a,b—that overlap spatially with this tracking area 200a,b. In adjacent or overlapping tracking areas 200a,b, the probability of finding the terminal device 102 is greater since usually most users of mobile terminal devices 102 rarely move quickly and over a great distance. If a response to the second device tracking call is received from the terminal device 102 within a predetermined period of time, then the communication connection to the terminal device 102 can be established. The prescribed period of time preferably corresponds to the period of time within which the response of the terminal device 102 is also expected after the first device tracking call. Likewise, however, another period of time can also be selected.

If no response to the second device tracking call is received from the terminal device 102 within the predetermined period of time, then a prescribed number of successive additional device tracking calls is transmitted, and, after each device tracking call, the system waits to see whether a response to the device tracking call is received within a prescribed period of time. If this is the case, then the paging is discontinued and the communication connection with the core network 100 is established. If no response has been received from the terminal device 102 after the prescribed number of device tracking calls have been transmitted, then the paging is discontinued without a result.

The areas in which the device tracking calls are transmitted are each expanded with respect to the previous areas until they comprise the entire equivalent area 202. With each expansion, one or more tracking areas 200*a,b* of the equivalent area 202 are added to the paging area. The added tracking areas 200*a,b* are preferably arranged spatially adjacent to or overlapping with the tracking areas 200*a,b* within which the preceding device tracking call was transmitted. In this process, the involved tracking areas 200*a,b* can be prescribed individually for each device tracking call, or else rules can be prescribed according to which the paging area is expanded. For example, such a rule can provide that, in each case, the tracking areas 200*a,b* of the equivalent area 202 that are spatially adjacent to or overlapping with the most recent paging area will be added to the paging area.

The most recent device tracking call or a device tracking call following the preceding, the first device tracking call, is transmitted within the entire equivalent area 202. Since the terminal device 102 is located in a radio cell of the equivalent area 202, insofar as it is not switched off or the contact to a radio network 104*a,b* has not been interrupted for other reasons, this ensures that the terminal device 102 can reliably be reached with this device tracking call.

In other exemplary embodiments, the first device tracking call is not transmitted within the tracking area 200*a,b* in which the terminal device 102 was located at the time of the most recent tracking area updating procedure, but rather in a smaller paging area. This can be the radio cell 108*a,b* that the terminal device reported to the core network 100 as the location at the time of the most recent tracking area updating procedure, or else the paging area comprises the radio cells 108*a,b* in which the terminal device 102 was located at the time of the most recent tracking area updating procedure and predetermined adjacent radio cells 108*a,b*. The adjacent radio cells 108*a,b* can be the adjacent radio cells 108*a,b* of the same radio network 104*a,b* that are supplied by the same base station 106*a,b*. This achieves that only one single base station 106*a,b* is involved during the first device tracking call.

As in the above-mentioned embodiment, after the device tracking call has been transmitted, the core network 100 checks whether a response was received from the terminal device 102 within a prescribed period of time. The duration of the period of time preferably corresponds to that of the corresponding period of time in the preceding embodiment. If a response to the first device tracking call is received from the terminal device 102, then the communication connection to the terminal device 102 is established.

If no response to the first device tracking call is received from the terminal device 102 within the prescribed period of time, then the core network 100 initiates a second device tracking call within a larger paging area. Here, the paging area for the second device tracking call can comprise the entire tracking area to which the radio cell 108*a,b* belongs and in which the terminal device 102 was located at the time of the most recent tracking area updating procedure. As an alternative, the paging area, also in the case of the second paging area, can encompass additional tracking areas 200*a,b*, preferably tracking areas 200*a,b* that are adjacent to the tracking area 200*a,b* or that overlap with the tracking area 200*a,b* in which the terminal device was located at the time of the most recent tracking area updating procedure.

After the second device tracking call, it is once again ascertained whether the terminal device 102 responds within a predetermined period of time. If this is the case, then the communication connection to the terminal device 102 is established. If the terminal device 102 does not respond, then, analogously to the previous embodiment, a predetermined number of successive additional device tracking calls is transmitted. After each device tracking call, the system ascertains whether the terminal device 102 responds within a predetermined period of time. If a response is received from the terminal device 102, then the communication connection is established; otherwise, the next device tracking call is transmitted. If no response to the most recent prescribed device tracking call is received, then the paging is discontinued. For the additional device tracking calls that follow the second device tracking call, the paging area is successively expanded until it encompasses the entire equivalent area 202 in which the terminal device 102 is located. With each expansion, the tracking areas 200*a,b* that are added to the paging area are preferably those that are arranged adjacent to or overlapping with the previous paging area.

The paging area is expanded in such a way that, at the time of the most recently provided device tracking call, it encompasses the entire equivalent area 202 in which the terminal device 102 is located. Here, it can be provided that already the third device tracking call is transmitted within the entire equivalent area 202 in order to limit the maximum number of device tracking calls needed.

Another exemplary embodiment provides that, during the periodical tracking area updating procedures, it is ascertained whether the terminal device 102 stays in one single tracking area 200*a,b* for a prolonged period of time. If this is the case, then the equivalent area 202 that is associated with the terminal device 102 is reduced to the tracking area in which the terminal device 102 is located.

For this purpose, the tracking areas 200*a,b* that the terminal device 102 reports during consecutive tracking area updating procedures are compared to each other in the core network. If it is determined that the tracking area 200*a,b* in which the terminal device 102 is located does not change after a predetermined number of tracking area updating procedures, then the equivalent area 202 is restricted to the tracking area 200*a,b* in which the terminal device 102 is located. Periodical tracking area updating procedures can be carried out at regular or predetermined time intervals.

As an alternative to restricting the equivalent area 202 to one single tracking area 200*a,b*, it can also be provided that the equivalent area 202 is restricted to several tracking areas 200*a,b* which were part of the original equivalent area 202 of the terminal device 102, and which the terminal device 102 has not left after a predetermined number of tracking area updating procedures. These can be, for instance, two or three adjacent tracking areas 200*a,b* within a general equivalent area 202, that is to say, one of the pre-configured equivalent areas 202, which can be restricted in this embodiment. This embodiment also makes it possible to restrict the paging area when a terminal device 102 only moves slightly, but changes continuously between two tracking areas 200*a,b*.

In this embodiment, the identifier of the equivalent area 202 is preferably not transmitted by the radio network 104*a,b* via the broadcast channel, but rather, the association of tracking areas 200*a,b* with equivalent areas 202 is stored in a list in the terminal device 102. After the equivalent area 202 has been restricted to one single tracking area 200*a,b*, this is also stored in the terminal device 102. For this purpose, for example, a new equivalent area 202 can be added to the list, said equivalent area 202 containing only the applicable tracking area 200a,b. The association of this tracking area 200a,b with the original equivalent area 202 is temporarily marked as invalid. Within the core network 100, the new equivalent area 202 of the terminal device 102 is likewise recorded in a database.

The new equivalent area 202 can be stored in the terminal device 102 on the basis of a message that is generated by the network when the new equivalent area 202 has been associated with the terminal device 102, and that is subsequently transmitted to the terminal device 102. Likewise, however, it can be provided that it is checked in the terminal device 102 itself whether the current tracking area 200a,b does not change after the prescribed number of consecutive tracking area updating procedures, and the new equivalent area 202 is stored if this is the case. This can be executed by an application that is carried out in the terminal device 102 itself, or in the subscriber identification module.

If the terminal device 102 leaves the tracking area 200a,b with which it has been associated as the equivalent area 202, then it enters a new equivalent area 202, and a tracking area updating procedure is carried out. After the tracking area updating procedure, the equivalent area 202 that had previously been temporarily associated with the terminal device 102 and that encompasses the tracking area 200a,b in which the terminal device 102 was located for a prolonged period of time is deleted. This is carried out in the network and in the terminal device 102. After the deletion, the generally defined equivalent areas 202 are once again used as the basis for the tracking area updating procedures and for the paging. Another restriction of the equivalent area 202 is carried out when the above-mentioned criteria for this are fulfilled.

As long as the terminal device 102 is temporarily associated with one single tracking area 200a,b as an equivalent area 202, a device tracking call is transmitted in the radio cells 108a,b of the tracking area 200a,b. In this manner, the terminal device 102 can be reached with a device tracking call, as long as it has not lost contact with the applicable radio network 104a,b. In order to also be able to reach the terminal device 102 with a device tracking call even when the contact with the radio network 104a,b is temporarily interrupted after one or more device tracking calls, the device tracking call is preferably repeated if a response from the terminal device 102 has not been received within a prescribed period of time. The number of repetitions and the duration of the time intervals between the device tracking calls are stored as parameters in the core network 100.

The person skilled in the art recognizes that the embodiments described above in which a restriction of the equivalent area 202 is provided and the previously described embodiments in which the paging area is successively expanded can be combined with each other or can be implemented simultaneously in a communication system. The specific embodiment to be used with a terminal device 102 is selected as a function of the situation.

Although the invention was described in detail in the drawings and in the preceding presentation, the presentations are to be construed as an illustration or by way of an example, and not in a limiting manner; in particular, the invention is not limited to the embodiments explained. Additional variants of the invention and its execution are obvious to the person skilled in the art from the disclosure given above, from the figures and from the patent claims.

Terms used in the patent claims such as "encompass", "comprise", "contain", "have" and the like do not exclude additional elements or steps. The use of the indefinite article does not preclude a plurality. Each individual device can execute the functions of several of the units or devices cited in the patent claims.

What is claimed is:

1. A method for locating a terminal device in a network system, at least one network having several cells that are combined to form one or more tracking areas, the one or more tracking areas being combined to form an equivalent area, the method comprising:
   transmitting a locating message from the terminal device to the at least one network when the terminal device enters the equivalent area;
   transmitting locating messages from the terminal device to the at least one network at predetermined time intervals;
   indicating via the locating messages a sub-area of the equivalent area in which the terminal device is located during the transmission of a locating message;
   storing at least the sub-area indicated in a most recently received locating message by the network; and
   transmitting at least a first terminal device tracking call by the network within the stored sub-area in order to locate the terminal device.

2. The method recited in claim 1, comprising transmitting from the network at least a second terminal device tracking call within a further sub-area of the equivalent area in which the stored sub-area is located if the terminal device does not respond to the first terminal device tracking call within a prescribed period of time.

3. The method recited in claim 2, wherein the further sub-area comprises at least one sub-area being spatially adjacent to the stored sub-area and belonging to the network to which the stored sub-area belongs.

4. The method recited in claim 2, wherein the further sub-area comprises at least one sub-area that spatially overlaps with the stored sub-area and/or is spatially adjacent to the stored sub-area and that belongs to a network that differs from the network to which the stored sub-area belongs.

5. The method recited in claim 2, wherein the further sub-area comprises at least one cell of the first network that is spatially adjacent to the stored sub-area, and/or the further sub-area comprises a cell area of the second network comprising at least one cell, and wherein the cell area spatially overlaps with the stored sub-area or is spatially adjacent to the stored sub-area.

6. The method recited in claim 2, wherein the further sub-area comprises at least one tracking area of the first network that is spatially adjacent to the stored sub-area, and/or that the further sub-area comprises a tracking area section of the second network comprising at least one tracking area, wherein the tracking area section spatially overlaps with the stored sub-area or is spatially adjacent to the stored sub-area.

7. The method recited in claim 2, wherein the further sub-area additionally comprises the stored sub-area.

8. The method recited in claim 2, wherein the further sub-area comprises the entire equivalent tracking area to which the first sub-area belongs.

9. The method recited in claim 1, wherein the stored sub-area is a first cell of a first network.

10. The method recited in claim 1, wherein the stored sub-area is a first tracking area of a first network.

11. The method recited in claim 1, wherein sub-areas which were indicated in several consecutively transmitted locating messages are stored by the network, and wherein the equivalent area is reduced in size to the sub-area indicated in the most recently received locating message if the sub-area indicated in the most recently received locating message corresponds to the sub-areas that are contained in a predetermined number of locating messages that preceded the most recently received locating message.

12. The method recited in claim 11, wherein the sub-areas are tracking areas.

13. The method recited in claim 11, comprising transmitting a locating message from the terminal device to the network system when the terminal device enters a cell of a network that does not belong to the reduced sub-area.

14. The method recited in claim 1, wherein the network system comprises an E-UTRAN.

15. A communication system, comprising:
- at least one network having several cells that are combined to form one or more tracking areas, one or more tracking areas of at least one network being combined to form one equivalent area;
- a terminal device that is configured to transmit a locating message to the network, when the terminal device enters an equivalent area, and/or to transmit locating messages to the network at predetermined time intervals, the locating messages indicating a sub-area of an equivalent area in which the terminal device is located during the transmission of a locating message; and
- a unit that stores at least the sub-area indicated in the most recently received locating message, and that triggers transmission of at least a first terminal device tracking call within the stored sub-area in order to locate the terminal device.

16. The communication system recited in claim 15, wherein at least a second terminal device tracking call is transmitted from the network within a further sub-area of the equivalent area in which the stored sub-area is located if the terminal device does not respond to the first terminal device tracking call within a prescribed period of time.

17. The communication system recited in claim 16, wherein the further sub-area comprises at least one sub-area being spatially adjacent to the stored sub-area and belonging to the network to which the stored sub-area belongs.

18. The communication system recited in claim 16, wherein the further sub-area comprises at least one sub-area that spatially overlaps with the stored sub-area and/or is spatially adjacent to the stored sub-area and that belongs to a network that differs from the network to which the stored sub-area belongs.

19. The communication system recited in claim 16, wherein the further sub-area comprises at least one cell of the first network that is spatially adjacent to the stored sub-area, and/or the further sub-area comprises a cell area of the second network comprising at least one cell, and wherein the cell area spatially overlaps with the stored sub-area or is spatially adjacent to the stored sub-area.

20. The communication system recited in claim 16, wherein the further sub-area comprises at least one tracking area of the first network that is spatially adjacent to the stored sub-area, and/or that the further sub-area comprises a tracking area section of the second network comprising at least one tracking area, wherein the tracking area section spatially overlaps with the stored sub-area or is spatially adjacent to the stored sub-area.

* * * * *